United States Patent [19]
Ando

[11] 3,932,089
[45] Jan. 13, 1976

[54] APPARATUS FOR MANUFACTURING WAVED NOODLES

[75] Inventor: Momofuku Ando, Osaka, Japan

[73] Assignee: Nissin Shokuhin Kaisha, Ltd., Osaka, Japan

[22] Filed: Feb. 8, 1974

[21] Appl. No.: 440,675

Related U.S. Application Data

[63] Continuation-in-part of Ser. No. 128,382, March 26, 1971, abandoned.

[52] U.S. Cl.................................. 425/294; 425/363
[51] Int. Cl.$^2$......................................... A21C 11/24
[58] Field of Search........... 425/294, 335, 363, 369, 425/223

[56] References Cited
UNITED STATES PATENTS

| | | | |
|---|---|---|---|
| 266,013 | 10/1882 | Brott | 425/363 X |
| 327,465 | 9/1885 | Spalding | 425/294 X |
| 625,739 | 5/1889 | Buerk | 425/294 |
| 2,031,573 | 2/1936 | Peterson | 425/294 |

Primary Examiner—Francis S. Husar
Assistant Examiner—David S. Safran
Attorney, Agent, or Firm—Ernest G. Montague; Karl F. Ross; Herbert Dubno

[57] ABSTRACT

An apparatus for manufacturing waved noodles comprises a pair of oppositely rotating rollers, each roller having a surface formed with a plurality of spaced grooves, the transversely spaced grooves extending circumferentially around the roller, and the peripheral portions of the rollers between at least two adjacent of the grooves constituting lips. At least one of the lips on at least one roller has a face set back from the other roller and defining a linking space between the adjacent grooves. The grooves are radially wider (i.e. of greater cross section) than the linking space, and there is a means for passing a sheet of dough between the rollers whereby the dough is pressed into the grooves and linkage space, thereby forming a waved noodle having at least two generally parallel bulky portions connected by at least one transversely extending linking portion.

3 Claims, 4 Drawing Figures

3,932,089

APPARATUS FOR MANUFACTURING WAVED NOODLES

CROSS REFERENCE TO RELATED APPLICATION

This is a continuation-in-part application to my co-pending U.S. Pat. application Ser. No. 128,382 filed Mar. 26, 1971 now abandoned.

FIELD OF THE INVENTION

The present invention relates to an apparatus for the manufacturing of improved noodles and to such improved noodles.

BACKGROUND OF THE INVENTION

In the manufacture of thick noodles used in cooking Lao-mien and other, dishes various inconveniences as set forth below occur. Examples of such thick noodles are Udon (Japanese noodle) and spaghetti.

1. The thickness of the noodle is in direct proportion to the time required to gelatinize the noodle to its center, that is, the thicker the noodle, the longer is the required gelatinizing time, and the more difficult it is to obtain uniformly gelatinized noodles.
2. When boiling noodles, the thicker the noodle, the greater the cooking time.
3. In dried noodles or instant Lao-miens, it is difficult to maintain uniform porosity in their structure because the noodles take a long time to dry or fry.
4. In fried noodles, the noodle is treated rapidly at high temperature for frying. When the noodle is thin, water and gas in the noodle is easily vaporized and released because the ratio of the surface area to the volume is large. When the noodle is thick, the ratio is reduced. Additionally, with the hindrance of the gelatinized starch layer in the surface of the noodle, water and gas in the noodle are vaporized and released only with difficulty and easily builds up foam. The resulting noodles have a rough surface, bad appearance, and unpalatability.

OBJECTS OF THE INVENTION

It is an object of the present invention to provide an apparatus for manufacturing a waved noodle whereby the above-mentioned defects of thick noodles are removed in accordance with the present invention.

It is another object of the present invention to provide an apparatus for manufacturing a waved noodle wherein one of the features is that the noodle is formed in waved shape in which two or more bulge portions of the noodles are linked together.

SUMMARY OF THE INVENTION

An apparatus for manufacturing a waved noodle, according to the invention comprises a pair of oppositely rotating rollers, each roller having a cross-section surface forming a plurality of spaced grooves extending circumferentially around the roller, portions of the rollers between the grooves forming lips or lands, and at least, one of the lips having a surface being inwardly truncated (radially set back) so as to define between the adjacent grooves a transverse linking space communicating with the adjacent circumferential grooves, the grooves being radially wider (thicker and of greater cross section) than the linking space and means for passing a sheet of dough between the rollers, whereby the dough is pressed into the grooves and linking spaces, thereby forming a waved noodle having at least two bulky portions connected by linking portions.

According to the present invention some of the lips have roller lands on which corresponding surfaces of the two rollers, abut one another.

BRIEF DESCRIPTION OF THE DRAWING

These and other objects will become apparent, from the following detailed description, reference being made to the accompanying drawings, in which.

SPECIFIC DESCRIPTION

Figure 1:
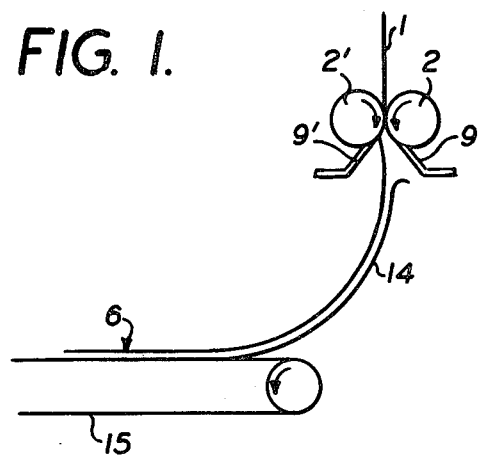
FIG. 1 is a side elevation, in longitudinal section, of the main part of the apparatus for manufacturing wavy noodles according to the present invention.
Figure 2:
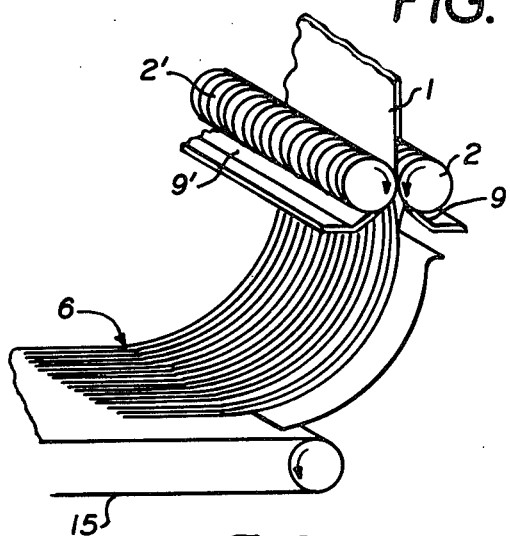
FIG. 2 is a perspective view of the main part of the apparatus of FIG. 1.

As can be seen from FIGS. 1 and 2, a pair of oppositely rotating rollers 2, 2' is provided. A sheet of dough 1, previously rolled into the form of a strip by a laminator (not shown), is passed between the two rollers 2 and 2'.

Figure 3:
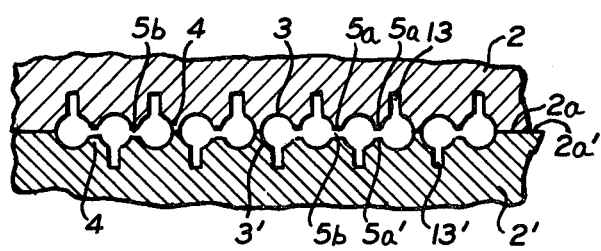
FIG. 3 is a fragmentary, enlarged cross-sectional view of the rollers of the apparatus.

FIG. 3, shows that the surfaces 2a and 2a' of the rollers are formed into a plurality of semi-circular cross-section grooves 3 and 3', respectively, which are recessed continuously around the circumferential surfaces of the rollers. Opposite grooves 3 and 3' of the respective rollers 2 and 2' mutually are aligned, forming circular cross-sectional toroidal confined spaces.

On the lateral borders or edges of adjacent semi-circular grooves 3 and 3', on each roller, lip portions 4 are formed. Some of the lip portions are set back inwardly, relative to the radially outermost roller surface 2a, to form cuts 5a and 5a', which cuts on opposite rollers are spaced apart to define therebetween annular confined spaces 5b; the annular spaces 5b form connecting or linking spaces between some of the circular section confined spaces formed by the adjacent grooves 3 and 3'.

Figure 4:
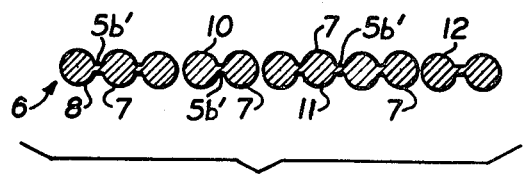
FIG. 4 is a cross-section of a waved noodle manufactured by the apparatus in accordance with the present invention.

In the confined spaces 3, 3' and 5b of the rollers, the dough is pressed and shaped and the resulting noodle product 6 conforms thereto and is shown in FIG. 4. Accordingly, as illustrated, although not limited thereto, by the form of the rollers 2 and 2' of FIG. 3, the noodle product 6 comprises: a noodle 8 having three circular section thick or bulge portions 7 with two interconnecting portions 5b' therebetween, at the left hand side of FIG. 4 (corresponding to the left hand side of the rollers of FIG. 3); a noodle 10, next to the leftmost noodle, having two circular bulge portions 7 and one connecting portion 5b'; a noodle 11, second noodle from the right-hand side, having four circular bulge portions 7 and three interconnecting portions 5b'; and a right-hand noodle 12 which is similar to noodle 10. The noodle parts 5b' thus link together two or more adjoining bulge portions 7.

The opposed roller peripheries of the lips 4 which abut each other cooperatively on the facing rollers 2 and 2', prevent communication of the adjacent grooves 3 and 3', and accordingly divide the noodle product 6 into the several noodles 8, 10, 11 and 12.

Each noodle which was rolled out between the rollers 2 and 2' has at least two peaks, i.e., bulge portions 7.

The rollers 2 and 2' are also formed with inwardly directed recesses 13 and 13', alternating respectively from every second semicircular groove 3 and 3', respectively, on each roller. The sets of recesses 13 and 13' are staggered relative to each other.

Combs 9 and 9' are provided in contact respectively with the recesses 13 and 13' and are positioned against the rollers 2 and 2', respectively. The combs 9 and 9' lift or comb off the noodles as they leave the rollers at the bottom thereof, as illustrated in FIGS. 1 and 2.

The resulting noodle product does not have any noodle portion corresponding to where the recesses 13 and 13' were located. The recesses 13 and 13' are provided merely for the combs 9 and 9'.

The produced noodle 6, after leaving the rollers, falls against and turns by a guide plate 14 and then is deposited on a conveyor belt 15.

In the embodiment of the present invention described above, the noodle thus obtained is a wide one which has two or more peaks 7, i.e., the thick portions 7 and the thin, linking portions between the peaks (i.e., dells). In spite of the thickness of the noodle, uniform gelatinization of this noodle is possible and too long a time is not required to boil, dry, or fry it. Because the ratio of the surface area to the volume is large, in addition, water and gas in the noodle are easily vaporized and released during frying. Thus, there is obtained a noodle of good appearance and pleasant feeling on the tongue.

Particularly, the term "lips" 4 represent the peripheral surface portions of the rollers between adjacent recesses 3 on each roller, e.g., either surfaces 4 (dividing noodle 7 groups) or spaced surfaces 5a, 5a', (forming linking portions 5b').

In accordance with the present invention a pair of rollers 2, 2', are so formed that parallel linked noodles are produced (as illlustrated in FIG. 4 of the present invention).

In accordance with the present invention the cross-sectionally shaped, e.g. semi-circular, recesses 3 are directly opposite each other on both rollers and at the edge portions there are provided surfaces 5a, 5a' to define therebetween linking portions 5b, which produce parallel noodles 7 linked with linking portions 5b'. To divide noodle groups 8 (a three parallel noodle group), 10 (a two noodle group), 11 (a four noodle group), and 12 (a two noodle group), from each other the peripheral surfaces of the opposed rollers abut each other (e.g. the surfaces numbered 4 in FIG. 3 immediately to the right of the third circular recess from the left hand side) to provide no space therebetween.

The peripheral surface (or face) portions of the rollers between adjacent grooves 3 or 31 on each roller which constitute spaced surfaces 5a, 5a' (FIG. 3 forming linking portions 5b).

In accordance with the structure in FIG. 3, after passing a material such as dough between the rollers there is produced different connected groups of noodles such as shown in FIG. 4.

The present invention further provides another benefit that larger amounts of seasoning can be accommodated on the surface of the noodle because of existence of the peaks 7 and the dells 5b', and then its palatability is improved.

I claim:

1. An apparatus for making noodles comprising a pair of oppositely rotating rollers adapted to receive a dough strip between them, said rollers being formed with transversely spaced circumferential grooves registering with one another to form cavities of large cross section and lands between said grooves and outwardly thereof, the lands outwardly of said grooves contacting each other at the nip of the rollers and the lands between said grooves being formed with circumferentially spaced recesses interconnecting the grooves and of a smaller cross section than said grooves; means for feeding a dough strip between said rollers whereby the dough of said strip is passed into said grooves and recesses to form noodles, consisting of at least two transversely spaced large cross section portions corresponding to said grooves and transverse connecting portions corresponding to said recesses, said grooves and said recesses being of semicircular cross section and said rollers being cylindrical, each of said rollers being provided with cavities extending radially inwardly from the respective grooves; and comb means reaching into said cavities.

2. The apparatus defined in claim 1 wherein said cavities are provided in alternate grooves along the rollers.

3. The apparatus defined in claim 2 wherein the cavities of the two rollers are offset from one another.

* * * * *